United States Patent [19]

Elrod et al.

[11] Patent Number: 4,751,530

[45] Date of Patent: Jun. 14, 1988

[54] ACOUSTIC LENS ARRAYS FOR INK PRINTING

[75] Inventors: Scott A. Elrod, Menlo Park; Butrus T. Khuri-Yakub, Palo Alto; Calvin F. Quate, Stanford, all of Calif.

[73] Assignee: Xerox Corporation, Stamford, Conn.

[21] Appl. No.: 944,698

[22] Filed: Dec. 19, 1986

[51] Int. Cl.$^4$ .............................................. G01D 15/16

[52] U.S. Cl. .................................. 346/140 R; 310/335

[58] Field of Search .................. 346/140, 75; 310/371, 310/335

[56] References Cited

U.S. PATENT DOCUMENTS

| | | | |
|---|---|---|---|
| 3,211,088 | 10/1965 | Naiman | 346/140 X |
| 4,184,094 | 1/1980 | Kopel | 310/335 |
| 4,303,927 | 12/1981 | Tsao | 346/75 |
| 4,308,547 | 12/1981 | Lovelady et al. | 346/140 |
| 4,321,696 | 3/1982 | Kanda | 310/335 X |
| 4,331,964 | 5/1982 | Van Lokeren | 346/75 |
| 4,384,231 | 5/1983 | Ishikawa | 310/335 |
| 4,390,886 | 6/1983 | Sultan | 346/140 |
| 4,580,148 | 4/1986 | Domoto et al. | 346/140 |
| 4,697,195 | 9/1987 | Quate | 346/140 |

FOREIGN PATENT DOCUMENTS 941213 10/1981 U.S.S.R. .

OTHER PUBLICATIONS

Petersen, Kurt E., "Silicon as a Mechanical Material", Proceedings of the IEEE, vol. 70, No. 5, May 1982, pp. 421–457.

Krause, K. A., "Focusing Ink Jet Head", IBM Technical Disclosure Bulletin, vol. 16, No. 4, Sep. 1973.

Wise, K. D. et al., "Fabrication of Hemispherical Structures Using Semiconductor Technology for Use in Thermonuclear Fusion Research", J. Vac. Sci. Technol., vol. 16, No. 3, May/Jun. 1979, pp. 936–939.

Quate, Calvin F., "The Acoustic Microscope", Scientific American, vol. 241, No. 4, Oct. 1979, pp. 62–70.

Quate, Calvin F., "Acoustic Microscopy", American Institute of Physics, Physics Today, Aug. 1985, pp. 34–42.

*Primary Examiner*—Joseph W. Hartary

[57] ABSTRACT

To facilitate the fabrication of acoustic printheads, arrays of spherical acoustic lenses are provided for bringing rf acoustic waves to essentially diffraction limited focii at or near the free surface of a pool of ink. These lenses produce focal patterns which are relatively free of localized amplitude variations, so they may be employed to fabricate acoustic printheads having relatively stable characteristics for acoustic printing.

20 Claims, 5 Drawing Sheets

ACOUSTIC LENS ARRAYS FOR INK PRINTING

FIELD OF THE INVENTION

This invention relates to acoustic printers and, more particularly, to printheads with integrated acoustic lens arrays for such printers.

BACKGROUND OF THE INVENTION

Substantial effort and expense have been devoted to the development of plain paper compatible direct marking technologies. The research and development activities relating to drop on demand and continuous stream ink jet printing account for a significant portion of this investment, even though conventional ink jets suffer from the fundamental disadvantage of requiring nozzles with small ejection orifices which easily clog. Unfortunately, the size of the ejection orifice is a critical design parameter of an ink jet because it determines the size of the droplets of ink that the jet ejects. As a result, the size of the ejection orifice cannot be increased, without sacrificing resolution.

Acoustic printing is a potenially important, alternative direct marking technology. It is still in an early stage of development, but the available evidence indicates that it is likely to compare favorably with conventional ink jet systems for printing either on plain paper or on specialized recording media, while providing significant advantages on its own merits. More particularly, acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. In keeping with still another feature of the technology, a copending and commonly assigned United States patent application of Elrod et al, which was filed Dec. 19, 1986 under Ser. No. 944,286 on "Variable Spot Size Acoustic Printing" shows that the size of the individual picture elements ("pixels") printed by an acoustic printer may be controlled during operation, either by varying the size of the individual droplets that are ejected, or by regulating the number of droplets that are used to form the individual pixels of the printed image.

As is known, an acoustic beam exerts a radiation pressure against objects upon which it impinges. Consequently, if an acoustic beam impinges on a free surface (i.e., liquid/air interface) of a pool of liquid from beneath, the radiation pressure which the beam exerts against the free surface may reach a sufficiently high level to release individual droplets of liquid from the surface of the pool, despite the restraining force of surface tension. To accomplish that, the acoustic beam advantageously is brought to focus on or near the surface of the pool, thereby intensifying its radiation pressure for a given amount of input power. These principles have been applied to ink jet and acoustic printing previously, using ultrasonic (rf) acoustic beams to release small droplets of ink from pools of ink. For example, K. A. Krause, "Focusing Ink Jet Head," *IBM Technical Disclosure Bulletin,* Vol 16, No. 4 September 1973, pp. 1168–1170 describes an ink jet in which an acoustic beam emanating from a concave surface and confined by a conical aperture is used to propel ink droplets out through a small ejection orifice. Lovelady et al. U.S. Pat. No. 4,308,547, which issued Dec. 29, 1981 on a "Liquid Droplet Emitter" showed that the small ejection orifice of the conventional ink jet is unnecessary. To that end, they provided spherical piezoelectric shells as transducers for supplying focused acoustic beams to eject droplets of ink from the free surface of a pool of ink. They also proposed acoustic horns driven by planar transducers to eject droplets of ink from an ink coated belt. Thereafter, to reduce the cost of acoustic printheads and to simplify the fabrication of multiple ejector arrays, a copending and commonly assigned U.S. Pat. No. 4,697,195 of C. F. Quate et al., which issued Sept. 29, 1987 on Nozzleless Liquid Droplet Ejectors introduced a planar interdigitated transducer (IDT) and planar IDT arrays, Quate et al also disclosed that the droplet ejection process can be controlled, either directly by modulating the acoustic beam or indirectly in response to supplemental bursts of power from a suitably controlled rf source.

The IDT provides an economical technology for fabricating arrays of acoustic droplet ejectors, but is hollow beam focal pattern results in a higher sensitivity to minor variations in the surface level of the ink than is desired for some applications. Accordingly, there still is a need for a technology which permits arrays of high ejection stability acoustic droplet ejectors to be assembled at moderate cost.

SUMMARY OF THE INVENTION

This invention responds to that need by providing spherical acoustic lens arrays for bringing rf acoustic waves to essentially diffraction limited focii at or near the free surface of a pool of ink. These lenses produce focal patterns which are relatively free of localized amplitude variations, so they may be employed to fabricate acoustic printheads having relatively stable characteristics for acoustic printing.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

Figure 1:
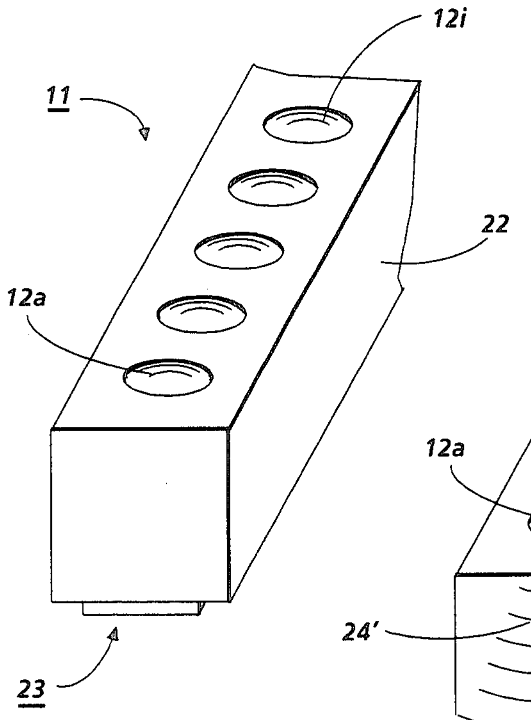
FIG. 1 is an isometric view of an acoustic printhead constructed in accordance with the present invention.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims. Turning now to the drawings, and at this point especially to FIGS. 1 and 2, there is an acoustic printhead 11 comprising an array of precisely positioned spherical acoustic lenses 12*a*–12*i* for launching a plurality of converging acoustic beams 15 into a pool of ink 16 (shown only in FIG. 2). Each of the acoustic beams 15 converges essentially symmetrically relative to the center of the lens 12*a* . . ., or 12*i* from which it originates, and the focal lengths of the lenses 12*a*–12*i* are selected so that each of the beams 15 comes to focus at or near the free surface (i. e., the liquid/air interface) 17 of the pool of ink 16. Suitably, the printhead 11 is submerged in the ink 16. Altenratively, the lenses 12*a*–12*i* may be coupled thereto by a low acoustic loss medium, such as via a thin film of mylar or the like (not shown).

The acoustic lenses 12*a*–12*i* are defined by small, generally spherically shaped indentations which are formed in the upper surface of a solid substrate 22. A piezoelectric transducer 23 is deposited on or otherwise maintained in intimate mechanical contact with the opposite or lower surface of the substrate 22, and a suitable rf source (not shown) is coupled across the transducer 23 to excite it into oscillation. The oscillation of the transducer 23 causes it to generate ultrasonic acoustic waves 24 for collectively or, as subsequently described in additional detail, separately illuminating the lenses 12*a*–12*i*. If the same acoustic wave 24 illuminates all of the lenses 12*a*–12*i*, its amplitude is selected to cause the beams 15 to excite the free surface 17 of the ink 16 to an incipient, subthreshold energy level for droplet formation. Additionally, a suitable source of supplemental power (not shown) is provided for selectively addressing the acoustically excited focal sites, so that individual droplets of ink are ejected from them on demand. See, the aforementioned Quate et al U.S. Pat. No. 4,697,195. Also see a copending and commonly assigned continuation of a United States patent application of S. A. Elrod, which was filed Jan. 21, 1986 under Ser. No. 820,045 on "Capillary Wave Controllers for Nozzleless Droplet Ejectors" (now abandoned).

Figure 3:
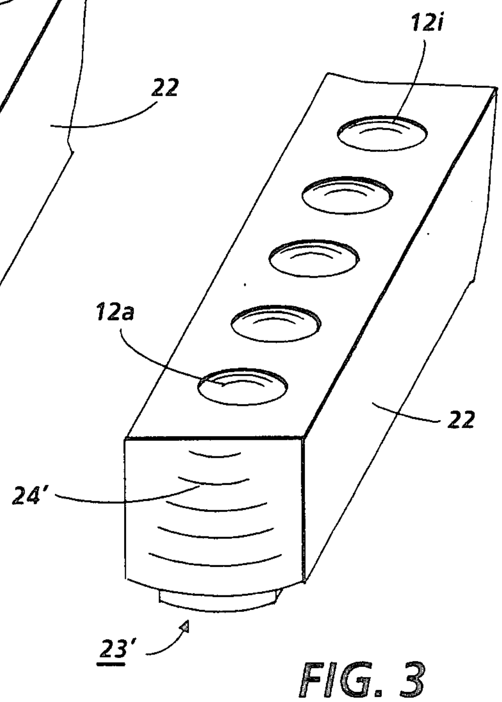
FIG. 3 is an isometric view of a modified printhead in which the acoustic beam is partially pre-focused by the transducer.
Figure 2:
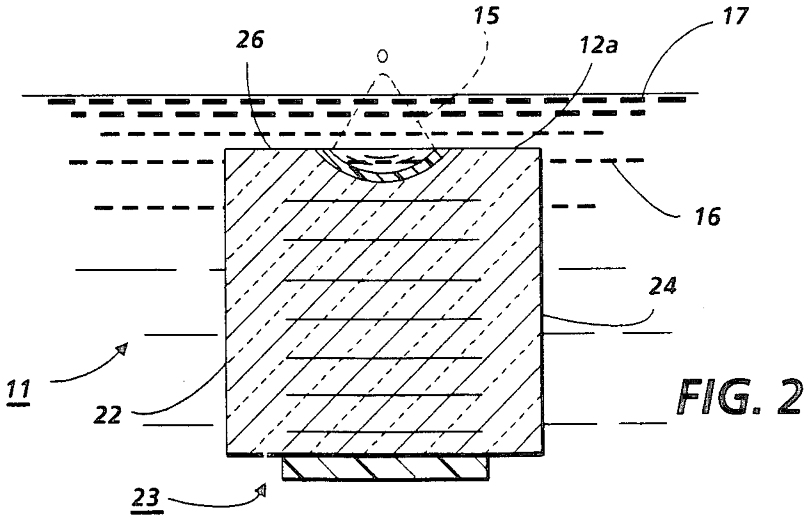
FIG. 2 an cross sectional view of the printhead shown in FIG. 1, with the printhead being submerged in a pool of ink for operation.

As illustrated in FIGS. 1 and 2 the transducer 23 has a planar profile, so it generates generally planar wavefront acoustic waves 24. However, transducers having other profiles may be employed. For example, as shown in FIG. 3, a cyclindrical transducer 23' may be employed for generating partially pre-focused acoustic waves 24' to illuminate a linear array of lenses 12*a*–12*i*.

In keeping with one of the more detailed aspects of this invention, to significantly reduce, if not eliminate, aberrations of the focused acoustic beams 15, the lens substrate 22 in composed of a material having an acoustic velocity, $v_s$, (i. e., the velocity of sound in the substrate 22) which is much higher than the velocity of sound in the ink 16, $v_i$, so $v_s > v_i$. Typically, the velocity of sound in the ink 16, $v_i$, is in the range of 1–2 km/sec. Thus, the substrate 22 may be composed of any one of a wide variety of materials, such as silicon, silicon nitride, silicon carbide, alumina, sapphire, fused quartz, and certain glasses, to maintain a refractive index ratio (as determined by the ratio of the acoustic velocities, $v_s/v_i$) in excess of 2.5:1 at the interface between the lenses 12*a*–12*i* and the ink 16. A 2.5:1 ratio is sufficient to ensure that the aberrations of the beams 15 are small. However, if the substrate 22 is composed of one of the higher acoustic velocity materials, such as silicon, silicon nitride, silicon carbide, alumina and sapphire, a refractive index ratio of 4:1 or higher can be easily achieved, thereby reducing the aberrations of the beams 15 to an essentially negligible level. See, C. F Quate, "The Acoustic Microscope" *Scientific American,* Vol. 241, No. 4. October 1979, pp 62–72 for a more detailed discussion of the principles involved.

Acoustic printing requires precise positioning of the lenses 12*a*–*12j* with respect to each other on very closely spaced centers. Preferably, therefore, in keeping with another aspect of this invention, the lenses 12*a*–12*i* are chemically etched or molded into the substrate 22. A suitable photolithographic process for isotropically etching them into silicon is described by K. D. Wise et al, "Fabrication of Hemispherical Structures Using Semiconductor Technology for Use in Thermonuclear Fusion Research," *J. Vac. Sci. Technol.*, Vol. 16, No. 3, May/June 1979, pp. 936–939 (which is hereby incorporated by reference), and that process may be extended to fabricating the lenses 12–12substrates 22 composed of other chemically etchable materials. Alternatively, the lenses 12*a*–12*i* may be cast into materials such as alumina, silicon nitride and silicon carbide through the use of hot press or injection molding processes. If desired, an anti-reflective coating 26 (FIG. 2), composed of a $\lambda_z/4$ thick layer of impedance matching material (where $\lambda_z$=the wavelength of the acoustic beams 15 in the coating 26), may be deposited on the outer spherical surfaces of the lenses 12*a*–12*i*.

Typically, the radii of the lenses 12*a*–12*i* are greater than the depth of the indentations which define them so that their focal plane is offset from the upper surface of the substrate 22 by a distance which is approximately equal to the thickness of the overlying layer of ink 16 (plus the thickness of any intervening medium, such as any film that is used to support the ink). Thus, if the lenses 12*a*–12*i* are chemically etched into the substrate 22 in accordance with the aforementioned teachings of Wise et al., a grinding operation, an additional chemical etch, or the like may be employed to cut the upper surface of the etched substrate 22 back to displace it by a sufficient distance from the focal plane of the lenses 12*a*–12*i*. Additionally, the finish on the upper surface of the substrate 22 may be roughened, such as by grinding, to diffusively scatter any incident acoustic energy that is not collected by the lenses 12–12*i*.

Figure 4A:
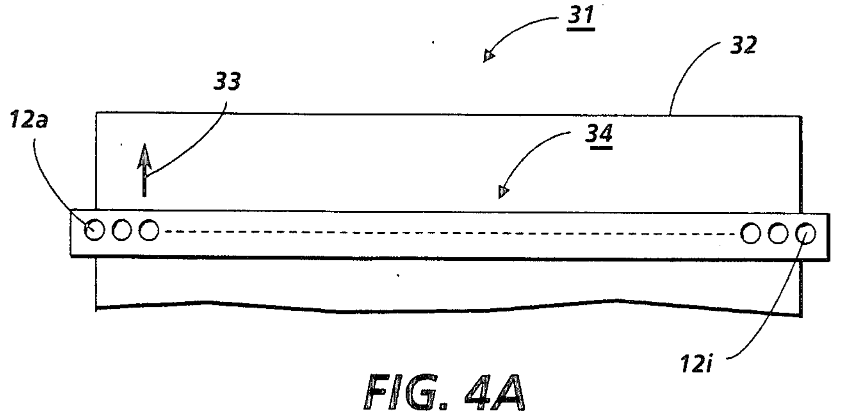
FIGS. 4A–4D are schematic views illustrating some of the printer configurations to which this invention can be applied.
Figure 4B:
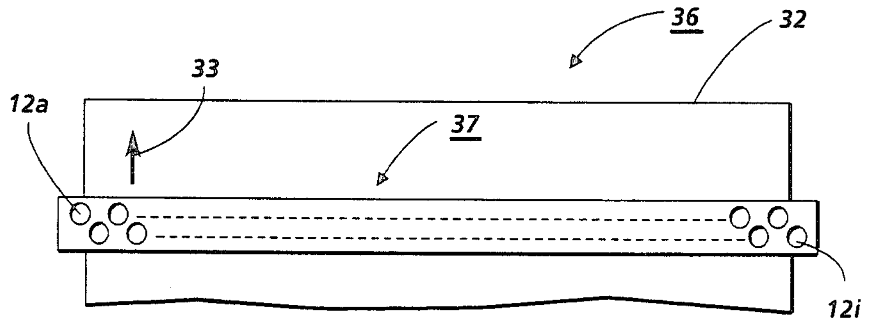
Figure 4C:
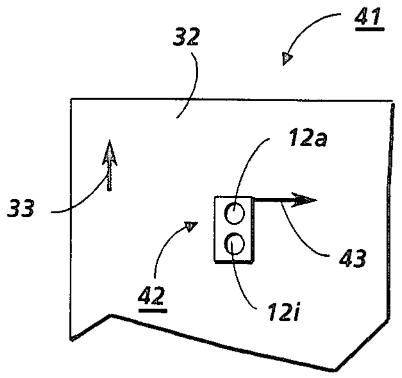
Figure 4D:
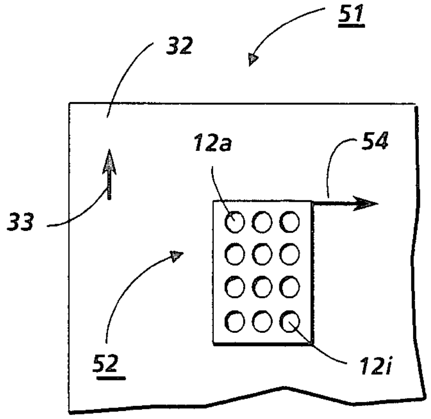

Linear and two dimensional lens arrays (as used herein a "two dimensional array" means an array having two or more rows of lenses) for various types of acoustic printing may be provided in accordance with this invention, including page width linear and two dimensional lens arrays for line printing, smaller linear arrays for multi-line raster printing, and two dimensional arrays for matrix printing. To emphasize that point, FIG. 4A schematically illustrates a line printer 31 in which a suitable recording medium 32, such as plain paper, is advanced in a sagittal direction, as indicated by the arrow 33, relative to a tangentially aligned page width linear lens array 34; FIG. 4B schematically illustrates another line printer 36 which has a page width two dimensional staggered lens array 37; FIG. 4C schematically illustrates a multi-line raster printer 41 in which the recording medium 32 is advanced in the sagittal direction while a sagittally oriented linear lens array 42 is being advanced in a tangential direction, as indicated by the arrows 33 and 43, respectively; and FIG. 4D schematically illustrates a matrix dot printer 51 in which the recording medium 32 is advanced along one axis of the matrix while a two dimensional, matrix configured lens array, 52 is being advanced along the orthogonal axis of the matrix, as indicated by the arrows 53 and 54, respectively. These examples are not exhaustive, but they illustrate the substantial design flexibility which exists.

Figure 5:
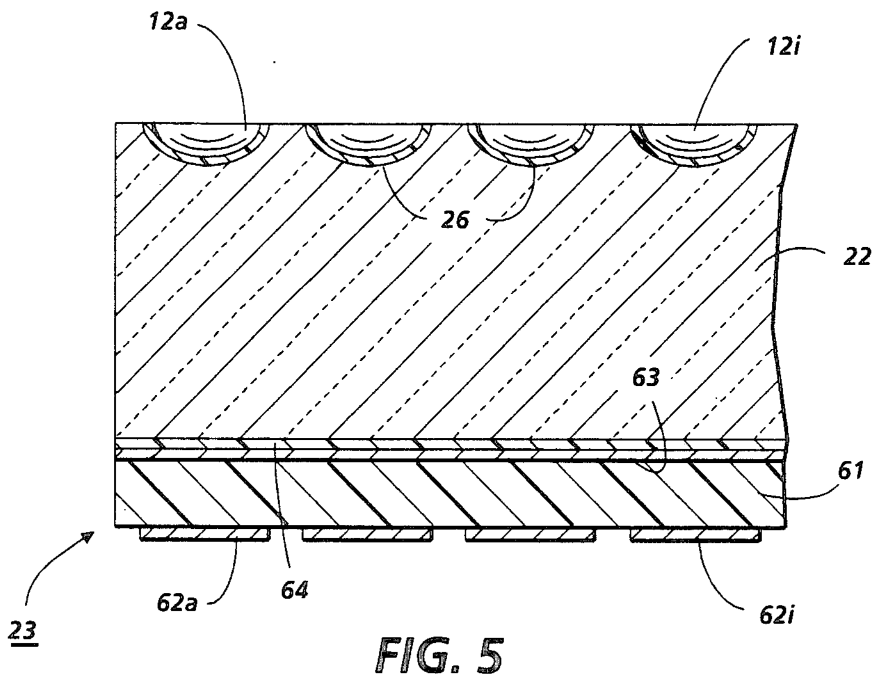
FIG. 5 is a more detailed longitudinal sectional view of an embodiment of the present invention in which the acoustic lenses are separately illuminated for drop on demand printing.
Figure 6:
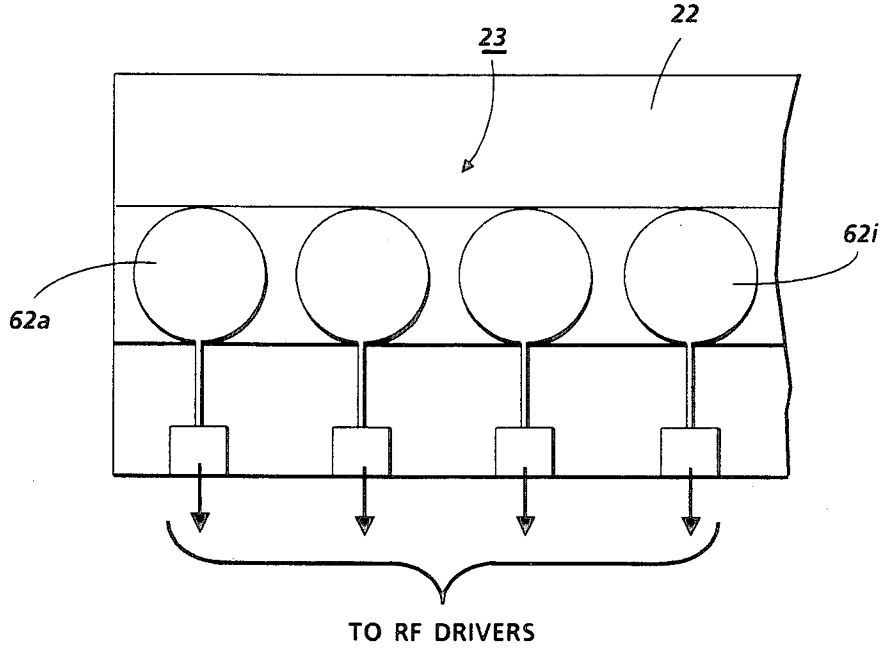
FIG. 6 is a bottom view of the printhead shown in FIG. 5.
Figure 8:
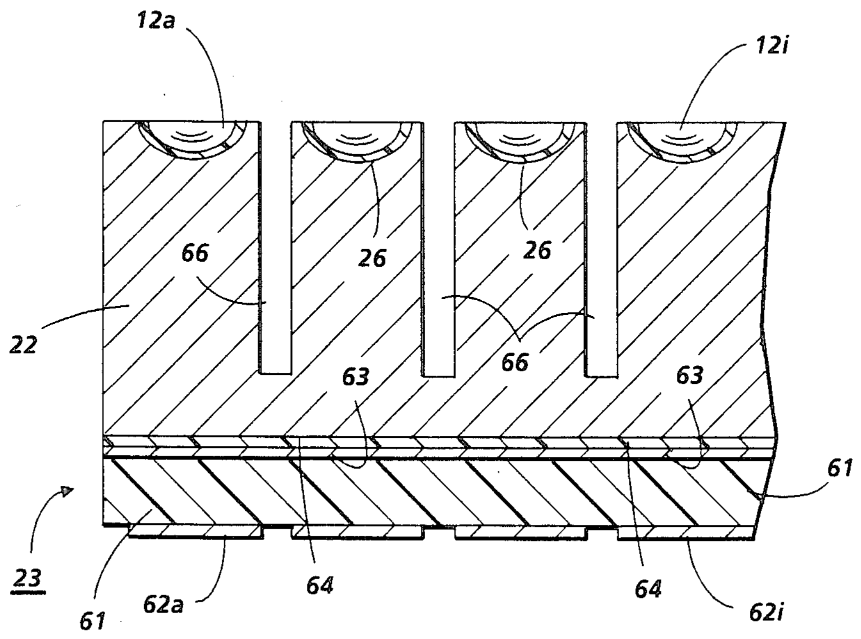

In keeping with an important feature of this invention, as shown in FIGS. 5 8, provision can be made for selectively and individually illuminating the lenses 12*a*–22*i* with separate acoustic waves 24 (FIG. 2). This permits the acoustic beams 15 (FIG. 2) to be independently modulated for spatially controlling the droplet ejection process on a lens-by-lens basis. To that end, in these more detailed embodiments the transducer 23 comprises a thin piezoelectric element 61, such as thin ZnO film or a thin $LiNbO_3$ crystal, which is sandwiched between an array or individually addressable electrodes 62*a*–62*i* (best shown in FIG. 6) and a counter electrode 63. The electrodes 62*a*–62*i* are placed so as to properly illuminate the lenses 12*a*–12*i* respectively. Furthermore, the transducer 23 is intimately mechanically coupled to the lower surface of the lens substrate 22. For example, the transducer counter electrode 63 may be deposited on the lower surface of the substrate 22, either directly or after that surface has been overcoated with a suitable electrical insulator 64, such as a layer of $SiO_2$.

In operation, independently controlled rf drive voltages are applied across the electrodes 62*a*–62*i*, respectively and the counter electrode 63, thereby locally exciting the piezoelectric element 61 into oscillation at spatially separated sites which are centered in the normal direction on the electrodes 62*a*–62*i*, respectively. The localized oscillations of the piezoelectric element 61 generate spatially displaced acoustic waves 24 which propagate through the substrate 22 in a predetermined direction to illuminate the lenses 12*a*–12*i*, respectively, Accordingly, the rf drive voltages which are applied to the electrodes 62–62*i* at any given time independently control the radiation pressures of the acoustic beams 15 that are launched into the ink 16 by the lenses 12*a*–12*i*, respectively, at that particular time. Typically, the transducer 23 has a relatively narrow bandwidth, so the droplet ejection process may be spatially controlled on a lens-by-lens basis by appropriately modulating the amplitude, frequency or duration of the drive voltages applied to the electrodes 62–62.

Figure 7:
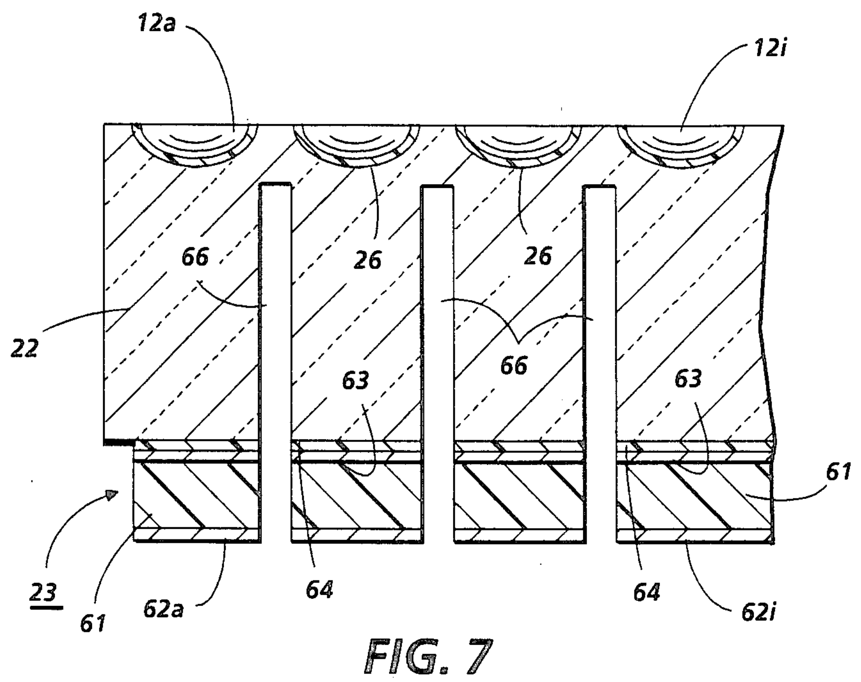
FIGS. 7 and 8 are longitudinal sectional views of alternative embodiments of the printhead shown in FIG. 5 to illustrate that provision may be made for acoustically isolating the lenses from each other.

As will be appreciated, the acoustic waves 24 (FIG. 2) are diffracted as they propagate through the substrate 22. This diffraction may be ignored, as indicated in FIG. 5, if the thickness of the substrate 22 is on the order of one Rayleigh length. However, if thicker substrates 22 are employed, the lenses 12*a*–2*i* referably are acoustically isolated from each other, such as by providing narrow slots 66 between them which are filled with air or some other medium having an acoustic impedance which differs significantly from the acoustic impedance of the substrate 22 such that an acoustic mismatch is created. These slots 66 may be extend upward through the lower surface of the substrate 22 (FIG. 7) or downward through its upper surface (FIG. 8). If the substrate 22 is composed of a chemically etchable crystalline material, such as silicon, the slots 66 may be anistropically etched therein. See, for example, K. E. Petersen, "Silicon as a Mechanical Material," *Proceedings of the IEEE*, Vol. 70, No. 5, May 1982, pp. 421-457.

Figure 9:
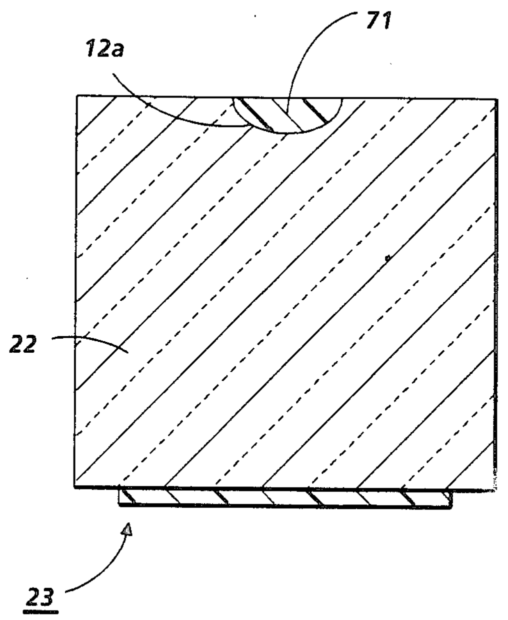
FIG. 9 is a cross sectional view of a planarized printhead.
Figure 10:
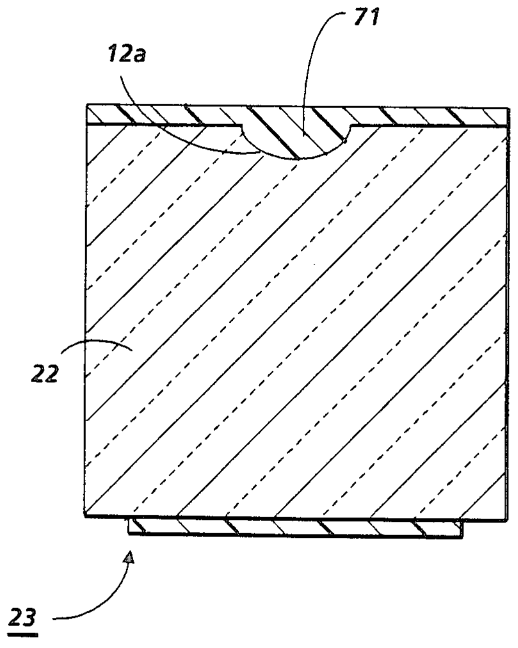
FIG. 10 is a cross sectional view of another planarized printhead

Preferably, the outer surfaces of the lenses 12*a*–12*i* have a smooth finish and are cleaned as required to remove particulate deposits from them, such as pigment and dust particles that may precipitate out of the ink 16. Furthermore, in some embodiments, it may be desirable to transport the ink 16 over the lenses 12*a*–12*i* on a thin mylar film or the like which may tend to abrade or drag against the edges of the lenses 12–*12i*. Therefore, as shown in FIG. 9, the lenses 12*a*–12*i* may be planarized, by filling the indentations which define them with a suitable polymer 71, such as an epoxy resin, or similar solid material having an acoustic impedance and velocity intermediate between the acoustic impedance and velocity of the ink 16 and the substrate 22. See a copending and commonly assigned United States patent application of Elrod et al, which was filed Dec. 19, 1986 under Ser. No. 944,145 on "Planarized Printheads for Acoustic Printing". This filler layer 71 may be flush with the upper surface of the substrate 22 (FIG. 9), or it may form a thin overcoating thereon (FIG. 10). The anti-reflective lens coating 26 (FIG. 2) is not shown in FIGS. 9 and 10 to emphasize that it is optional. One of the more important applications of the present invention relates to providing page width acoustic print heads for line printing, so that application will be reviewed in additional detail. As is known, the diameter of the spot or "pixel" that a droplet of ink makes when deposited on paper is approximately equal to twice the diameter of the droplet. Therefore, a page width linear array of substantially identical acoustic lenses 12*a*–12*i* (FIG. 4A), each designed to provide a focused acoustic beam 15, is sufficient to print an essentially unbroken line of ink across the full width of the page, provided that multiple droplets of ink are placed on each pixel as described below. Alternatively, the same result can be achieved through the use of a page width two dimensional array comprising two or nore staggered rows of lenses (FIG. 4B), with each of the lenses being designed to provide a focused beam having a waist diameter equal to one quarter the center-to-center spacing of the lenses. Furthermore, the center-to-center spacings of the lenses within these arrays may be increased, without impairing their solid line printing capability, if the duration of the rf drive pulses applied to the transducer drive electrodes 62*a*–62*i* is increased (typically, the duration of the rf pulses for drop on demand printing is restricted to a range from about 1μsec and 100μsec). If the electrodes 62*a*–62*i* are rapidly and repeatedly pulsed to deposit up to as many as fifteen or so droplets on each pixel, the lens spacing may also be increased. See the aforementioned Elrod et al application on "Variable Spot Size Acoustic Printing". These pulse width modulation and multiple droplet printing techniques may be combined to increase the size of the pixels printed by a given spherical lenstype droplet ejector by a factor of more than four, so part of the pixel size control capacity may be utilized to increase the center-to-center spacing of the lenses 12*a*–12*i*, with the remainder being held in reserve to provide a gray scale representation when desired.

For example, a pixel diameter of about 50 microns is required to provide a resolution of roughly 500 spi, which is typical of the resolution needed for high quality printing. This suggests a center-to-center spacing of approximately 100 microns for the lenses of a dual row staggered array. More particularly, it can be shown that a rf frequency on the order of 50 MHz is sufficient to print 50 micron spots. The wavelength, $\lambda_i$ of the acoustic beams 15 in the ink 16 at that frequency is approximately 30 microns. Moreover, at the aforementioned acoustic velocity ratios, $v_s/v_i$ of 2.5:1 and 4:1, the corresponding wavelengths, $\lambda_s$, of the acoustic waves 24 in the substrate 22 are 75 microns and 120 microns, respectively. Fortunately, it has been found that small aperture lenses 12a–12i (lenses having apertures, $A < 10\lambda_i$) provide sufficient focusing of the acoustic beams 15 on the free surface 17 of the ink 16 to eject individual droplets of ink therefrom on demand. See another copending and commonly assigned United States patent application of Elrod et al, which was filed Dec. 19, 1986 under Ser. No. 944,490 on "Microlenses for Acoustic Printing". It is not yet known precisely how small the lens apertures may be made while still providing sufficient focusing of the beams for drop on demand printing, but it has been experimentally verified that drop on demand operation can be achieved using lenses having apertures as small as $1.5\lambda_s$, which corresponds to a lens aperture of approximately $6\lambda_i$ at a 4:1 ratio between the acoustic velocities of the substrate 22 and the ink 16.

CONCLUSION

In view of the foregoing, it will now be understood that the present invention permits arrays of relatively stable acoustic droplet ejectors to be assembled at moderate cost. Moreover, it will be apparent that droplet ejector arrays embodying this invention may be employed for various forms of acoustic printing.

What is claimed is:

1. An acoustic printhead for ejecting droplets of ink on demand from a free surface of a pool of liquid ink, said ink having a predetermined acoustic velocity; said printhead comprising a solid substrate having an upper surface with a plurality of essentially identical, generally spherically shaped indentations formed therein on predetermined centers to define an array of acoustic lenses, and a lower surface; said substrate being composed of a material having an acoustic velocity which is substantially higher than the acoustic velocity of said ink; and piezoelectric transducer means intimately coupled to the lower surface of said substrate for generating rf acoustic waves to illuminate said lenses, such that said lenses launch respective converging acoustic beams into said ink, with the focal lengths of said lenses being selected to cause said beams to come to focus on spaced apart centers approximately at said free surface.

2. The printhead of claim 1 wherein said acoustic lenses are aligned to define a page width long linear array of lenses.

3. The printhead of claim 1 wherein said acoustic lenses are aligned to define a page width long two dimensional array of staggered lenses.

4. The printhead of claim 1 wherein said acoustic lenses are aligned to define a linear array of lenses.

5. The printhead of claim 1 wherein said said acoustic lenses are aligned to define a two dimensional array of lenses.

6. The printhead of any one of claim 1–5 wherein said transducer means supplies independently modulated rf acoustic waves for individually illuminating said lenses, whereby said lenses launch separately modulated acoustic beams into said ink, with the modulation of said acoustic beams being controlled on a lens-by-lens basis for drop on demand printing.

7. The printhead of claim 6 wherein said substrate has acoustic impedance mismatch regions which are disposed between said lenses for acoustically isolating said lenses from each other.

8. The printhead of claim 7 wherein said impedance mismatch regions extend upward into said substrate from its lower surface.

9. The printhead of claim 7 wherein said impedance mismatch regions extend downward into said substrate from its upper surface.

10. The printhead of claim 1 wherein the velocity of sound in said substrate is at least 2.5 times higher than the velocity of sound in said ink.

11. The printhead of claim 10 wherein the velocity of sound in said substrate is at least four times higher than the velocity of sound in said ink.

12. The printhead of claim 1 wherein said indentations are filled with a solid material having an acoustic velocity comparable to that of said ink, whereby said printhead presents a generally planar upper surface to said ink.

13. The printhead of claim 12 wherein the velocity of sound in said substrate is at least 2.5 times higher than the velocity of sound in said ink.

14. The printhead of claim 12 wherein the velocity of sound in said substrate is at least four times higher than the velocity of sound in said ink.

15. The printhead of claim 1 wherein said acoustic waves have a predetermined wavelength in said substrate, and said acoustic lenses have a predetermined diameter which is less than ten times said wavelength.

16. The printhead of claim 15 wherein the velocity of sound in said substrate is at least 2.5 times higher than the velocity of sound in said ink.

17. The printhead of claim 16 wherein the velocity of sound in said substrate is at least four times higher than the velocity of sound in said ink.

18. The printhead of any of claim 17 wherein said transducer means supplies independently modulated rf acoustic waves for individually illuminating said lenses, whereby said lenses launch separately modulated acoustic beams into said ink, with the modulation of said acoustic beams being controlled on a len-by-lens basis for drop on demand printing.

19. The printhead of claim 18 wherein said indentations are filled with a solid material having an acoustic velocity comparable to that of the ink, whereby said acoustic beams are launched into said ink from a generally planar surface of said printhead.

20. The printhead of any one of claims 1 and 7–19 wherein said substrate and said transducer means are submerged in said ink,

* * * * *